(12) United States Patent
Fischer et al.

(10) Patent No.: US 11,126,638 B1
(45) Date of Patent: Sep. 21, 2021

(54) DATA VISUALIZATION AND PARSING SYSTEM

(71) Applicant: Palantir Technologies Inc., Palo Alto, CA (US)

(72) Inventors: Jack Fischer, Briarcliff Manor, NY (US); Alan Hsieh, San Francisco, CA (US); Andrew Jiang, San Jose, CA (US)

(73) Assignee: Palantir Technologies Inc., Palo Alto, CA (US)

(*) Notice: Subject to any disclaimer, the term of this patent is extended or adjusted under 35 U.S.C. 154(b) by 104 days.

(21) Appl. No.: 16/149,012

(22) Filed: Oct. 1, 2018

Related U.S. Application Data

(60) Provisional application No. 62/730,986, filed on Sep. 13, 2018.

(51) Int. Cl.
*G06F 16/26* (2019.01)
*G06F 3/0484* (2013.01)
(Continued)

(52) U.S. Cl.
CPC ........... *G06F 16/26* (2019.01); *G06F 3/0481* (2013.01); *G06F 3/04842* (2013.01);
(Continued)

(58) Field of Classification Search
CPC .... G06F 16/26; G06F 3/04842; G06F 3/0481; G06F 3/04847; G06T 11/206; G06T 2200/24
(Continued)

(56) References Cited

U.S. PATENT DOCUMENTS

| 5,515,488 A | 5/1996 | Hoppe et al. |
| 6,190,324 B1 * | 2/2001 | Kieval ................... A61B 5/024 |
| | | 600/483 |

(Continued)

FOREIGN PATENT DOCUMENTS

| CN | 102546446 | 7/2012 |
| CN | 103167093 | 6/2013 |

(Continued)

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

(Continued)

*Primary Examiner* — Henry Orr
(74) *Attorney, Agent, or Firm* — Knobbe, Martens, Olson & Bear, LLP

(57) ABSTRACT

A user data visualization and parsing system may receive from a user a selection of a first data item from a data set, the data item associated with a location identifier. The data visualization and parsing system may extract a first value of the first data item associated with the location identifier and identify, in a second data set of the data stream, a second data item associated with the location identifier. The system may extract a second value of the second data item associated with the location identifier, generate a visual representation of the first and second values, and display the visual representation to the user through the user interface.

15 Claims, 7 Drawing Sheets

(51) Int. Cl.
*G06T 11/20* (2006.01)
*G06F 3/0481* (2013.01)

(52) U.S. Cl.
CPC ........ *G06F 3/04847* (2013.01); *G06T 11/206* (2013.01); *G06T 2200/24* (2013.01)

(58) Field of Classification Search
USPC ....................................................... 715/771
See application file for complete search history.

(56) References Cited

U.S. PATENT DOCUMENTS

| | | | |
|---|---|---|---|
| 6,430,305 | B1 | 8/2002 | Decker |
| 6,581,068 | B1* | 6/2003 | Bensoussan ...... G06F 16/24539 |
| 6,820,135 | B1 | 11/2004 | Dingman |
| 6,978,419 | B1 | 12/2005 | Kantrowitz |
| 6,980,984 | B1 | 12/2005 | Huffman et al. |
| 7,168,039 | B2 | 1/2007 | Bertram |
| 7,461,077 | B1 | 12/2008 | Greenwood |
| 7,617,232 | B2 | 11/2009 | Gabbert et al. |
| 7,756,843 | B1 | 7/2010 | Palmer |
| 7,899,796 | B1 | 3/2011 | Borthwick et al. |
| 7,917,376 | B2 | 3/2011 | Bellin et al. |
| 7,941,321 | B2 | 5/2011 | Greenstein et al. |
| 8,036,971 | B2 | 10/2011 | Aymeloglu et al. |
| 8,037,046 | B2 | 10/2011 | Udezue et al. |
| 8,046,283 | B2 | 10/2011 | Burns |
| 8,054,756 | B2 | 11/2011 | Chand et al. |
| 8,214,490 | B1 | 7/2012 | Vos et al. |
| 8,229,902 | B2 | 7/2012 | Vishniac et al. |
| 8,290,838 | B1 | 10/2012 | Thakur et al. |
| 8,302,855 | B2 | 11/2012 | Ma et al. |
| 8,386,377 | B1 | 2/2013 | Xiong et al. |
| 8,473,454 | B2 | 6/2013 | Evanitsky et al. |
| 8,484,115 | B2 | 7/2013 | Aymeloglu et al. |
| 8,489,641 | B1 | 7/2013 | Seefeld et al. |
| 8,577,911 | B1 | 11/2013 | Stepinski et al. |
| 8,589,273 | B2 | 11/2013 | Creeden et al. |
| 8,688,573 | B1 | 4/2014 | Ruknoic et al. |
| 8,744,890 | B1 | 6/2014 | Bernier |
| 8,799,799 | B1 | 8/2014 | Cervelli et al. |
| 8,806,355 | B2 | 8/2014 | Twiss et al. |
| 8,812,960 | B1 | 8/2014 | Sun et al. |
| 8,924,388 | B2 | 12/2014 | Elliot et al. |
| 8,924,389 | B2 | 12/2014 | Elliot et al. |
| 8,938,686 | B1 | 1/2015 | Erenrich et al. |
| 8,949,164 | B1 | 2/2015 | Mohler |
| 9,069,842 | B2 | 6/2015 | Melby |
| 9,100,428 | B1 | 8/2015 | Visbal |
| 9,111,281 | B2 | 8/2015 | Stibel et al. |
| 9,129,219 | B1 | 9/2015 | Robertson et al. |
| 9,256,664 | B2 | 2/2016 | Chakerian et al. |
| 9,280,618 | B1 | 3/2016 | Bruce et al. |
| 9,286,373 | B2 | 3/2016 | Elliot et al. |
| 9,335,911 | B1 | 5/2016 | Elliot et al. |
| 9,501,851 | B2* | 11/2016 | Cervelli ............. G06F 3/04847 |
| 9,767,172 | B2* | 9/2017 | Fackler ................. G06F 16/252 |
| 9,891,808 | B2* | 2/2018 | Wilson ............... G06F 3/04817 |
| 10,061,824 | B2* | 8/2018 | Robichaud ............. G06F 16/26 |
| 2002/0065708 | A1 | 5/2002 | Senay et al. |
| 2002/0091696 | A1* | 7/2002 | Craft ....................... G06F 16/90 |
| 2002/0095360 | A1 | 7/2002 | Joao |
| 2002/0095658 | A1 | 7/2002 | Shulman |
| 2002/0103705 | A1 | 8/2002 | Brady |
| 2002/0147805 | A1 | 10/2002 | Leshem et al. |
| 2003/0126102 | A1 | 7/2003 | Borthwick |
| 2004/0034570 | A1 | 2/2004 | Davis |
| 2004/0111480 | A1 | 6/2004 | Yue |
| 2004/0153418 | A1 | 8/2004 | Hanweck |
| 2004/0236688 | A1 | 11/2004 | Bozeman |
| 2005/0010472 | A1 | 1/2005 | Quatse et al. |
| 2005/0086207 | A1 | 4/2005 | Heuer et al. |
| 2005/0154628 | A1 | 7/2005 | Eckart et al. |
| 2005/0154769 | A1 | 7/2005 | Eckart et al. |
| 2006/0026120 | A1 | 2/2006 | Carolan et al. |
| 2006/0026170 | A1 | 2/2006 | Kreitler et al. |
| 2006/0048044 | A1* | 3/2006 | Genesereth ........... G06F 17/246 715/213 |
| 2006/0080283 | A1 | 4/2006 | Shipman |
| 2006/0143034 | A1 | 6/2006 | Rothermel |
| 2006/0143075 | A1 | 6/2006 | Carr et al. |
| 2006/0143079 | A1 | 6/2006 | Basak et al. |
| 2007/0000999 | A1 | 1/2007 | Kubo et al. |
| 2007/0011304 | A1 | 1/2007 | Error |
| 2007/0038646 | A1 | 2/2007 | Thota |
| 2007/0150801 | A1 | 6/2007 | Chidlovskii et al. |
| 2007/0156673 | A1 | 7/2007 | Maga |
| 2007/0162454 | A1 | 7/2007 | D'Albora et al. |
| 2007/0185867 | A1 | 8/2007 | Maga |
| 2007/0192122 | A1 | 8/2007 | Routson et al. |
| 2007/0284433 | A1 | 12/2007 | Domenica et al. |
| 2008/0065655 | A1 | 3/2008 | Chakravarthy et al. |
| 2008/0069081 | A1 | 3/2008 | Chand et al. |
| 2008/0077642 | A1 | 3/2008 | Carbone et al. |
| 2008/0103996 | A1 | 5/2008 | Forman et al. |
| 2008/0208735 | A1 | 8/2008 | Balet et al. |
| 2008/0222295 | A1 | 9/2008 | Robinson et al. |
| 2008/0243711 | A1 | 10/2008 | Aymeloglu et al. |
| 2008/0255973 | A1 | 10/2008 | El Wade et al. |
| 2008/0270328 | A1 | 10/2008 | Lafferty et al. |
| 2008/0294663 | A1 | 11/2008 | Heinley et al. |
| 2008/0313132 | A1 | 12/2008 | Hao et al. |
| 2009/0013287 | A1* | 1/2009 | Heitman ................ G06T 11/206 715/853 |
| 2009/0076845 | A1 | 3/2009 | Bellin et al. |
| 2009/0094166 | A1 | 4/2009 | Aymeloglu et al. |
| 2009/0094270 | A1 | 4/2009 | Alirez et al. |
| 2009/0106178 | A1 | 4/2009 | Chu |
| 2009/0112745 | A1 | 4/2009 | Stefanescu |
| 2009/0125359 | A1 | 5/2009 | Knapic |
| 2009/0125459 | A1 | 5/2009 | Norton et al. |
| 2009/0132953 | A1 | 5/2009 | Reed et al. |
| 2009/0157732 | A1 | 6/2009 | Hao et al. |
| 2009/0187546 | A1 | 7/2009 | Whyte et al. |
| 2009/0187548 | A1 | 7/2009 | Ji et al. |
| 2009/0249244 | A1 | 10/2009 | Robinson et al. |
| 2009/0254842 | A1 | 10/2009 | Leacock et al. |
| 2009/0259636 | A1 | 10/2009 | Labrou et al. |
| 2009/0271343 | A1 | 10/2009 | Vaiciulis et al. |
| 2009/0307049 | A1 | 12/2009 | Elliott et al. |
| 2009/0313463 | A1 | 12/2009 | Pang et al. |
| 2009/0319418 | A1 | 12/2009 | Herz |
| 2009/0319515 | A1 | 12/2009 | Minton et al. |
| 2009/0319891 | A1 | 12/2009 | MacKinlay |
| 2010/0030722 | A1 | 2/2010 | Goodson et al. |
| 2010/0031141 | A1 | 2/2010 | Summers et al. |
| 2010/0042922 | A1 | 2/2010 | Bradateanu et al. |
| 2010/0057622 | A1 | 3/2010 | Faith et al. |
| 2010/0070842 | A1 | 3/2010 | Aymeloglu et al. |
| 2010/0098318 | A1 | 4/2010 | Anderson |
| 2010/0106752 | A1 | 4/2010 | Eckardt et al. |
| 2010/0114887 | A1 | 5/2010 | Conway et al. |
| 2010/0128988 | A1* | 5/2010 | Kincaid ............. G06K 9/00147 382/199 |
| 2010/0131502 | A1 | 5/2010 | Fordham |
| 2010/0161735 | A1 | 6/2010 | Sharma |
| 2010/0191563 | A1 | 7/2010 | Schlaifer et al. |
| 2010/0211535 | A1 | 8/2010 | Rosenberger |
| 2010/0235915 | A1 | 9/2010 | Memon et al. |
| 2010/0262688 | A1 | 10/2010 | Hussain et al. |
| 2010/0293174 | A1 | 11/2010 | Bennett et al. |
| 2010/0312837 | A1 | 12/2010 | Bodapati et al. |
| 2010/0313127 | A1* | 12/2010 | Gosper ................. G06F 17/246 715/708 |
| 2011/0040776 | A1 | 2/2011 | Najm et al. |
| 2011/0061013 | A1 | 3/2011 | Bilicki et al. |
| 2011/0078173 | A1 | 3/2011 | Seligmann et al. |
| 2011/0093327 | A1 | 4/2011 | Fordyce, III et al. |
| 2011/0099133 | A1 | 4/2011 | Chang et al. |
| 2011/0153384 | A1 | 6/2011 | Horne et al. |
| 2011/0173093 | A1 | 7/2011 | Psota et al. |
| 2011/0208565 | A1 | 8/2011 | Ross et al. |
| 2011/0208724 | A1 | 8/2011 | Jones et al. |
| 2011/0213655 | A1 | 9/2011 | Henkin |

(56) References Cited

U.S. PATENT DOCUMENTS

| | | |
|---|---|---|
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2013/0339099 A1* | 12/2013 | Aidroos ................ G06Q 50/01 705/7.36 |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |
| 2016/0238406 A1* | 8/2016 | Burtner ................ G06F 16/22 |
| 2016/0259820 A1* | 9/2016 | Talmaki ............. G06F 16/254 |
| 2017/0153914 A1* | 6/2017 | Rausch ............. G06F 16/24532 |
| 2017/0371881 A1* | 12/2017 | Reynolds ............ G06F 16/256 |
| 2018/0089188 A1* | 3/2018 | Kharisma .......... G06F 16/2477 |
| 2019/0026635 A1* | 1/2019 | Wang .................... G06N 5/04 |
| 2019/0050116 A1* | 2/2019 | Kim .................. G06F 3/04842 |
| 2019/0121807 A1* | 4/2019 | Boutros ............ G06F 16/2428 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

DISTIMO—App Analytics, <http://www.distimo.com/app-analytics> Printed Jul. 18, 2013 in 5 pages.

Flurry Analytics, <http://www.flurry.com/> Printed Jul. 18, 2013 in 14 pages.

Gill et al., "Computerised Linking of Medical Records: Methodological Guidelines,".

Google Analytics Official Website—Web Analytics & Reporting, <http://www.google.com/analytics.index.html> Printed Jul. 18, 2013 in 22 pages.

(56) References Cited

OTHER PUBLICATIONS

Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheetpdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"SAP BusinessObjects Explorer Online Help," Mar. 19, 2012, retrieved on Apr. 21, 2016 http://help.sap.com/businessobject/product_guides/boexir4/en/xi4_exp_user_en.pdf.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

DATA VISUALIZATION AND PARSING SYSTEM

TECHNICAL FIELD

The present disclosure relates to systems and techniques for data visualization and parsing. More specifically, the present disclosure relates to data visualization and parsing configured to identify selected data items throughout a data stream and generate a visual representation of the data that is easily reviewable by a user.

BACKGROUND

Data is collected and stored in a variety of formats to be utilized or relied upon by programs, applications, or data stores. Often, data or information is collected by a variety of devices (e.g., sensors, accelerometers, barometers, thermometers, etc.) to provide important measurements. For convenience, such data may be represented in machine-readable formats intended principally for processing by machines. However, because machine-readable data is formatted for machines, a user receiving the data may not understand what the received data represents and must expend time and effort to convert data from the machine-readable format to a format easily interpreted by humans (e.g., text, PDF, image file, etc.). Furthermore, because a data stream may contain multiple types and sources of data, it may be difficult for the user to understand the significance of particular portions of data. For example, a user viewing machine-readable data could not track changes in particular types of data across multiple (e.g. hundreds, thousands or more) sets (or "chunks") of data that may each include values associated with the particular type of data.

SUMMARY

The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One aspect of the disclosure provides a system for data visualization and parsing. The system comprises a first non-transitory computer storage medium configured to store a data stream, a second non-transitory computer storage medium configured to at least store computer-executable instructions, and one or more computer hardware processors. The one or more computer hardware processors may be configured to execute the computer-executable instructions to at least display in a user interface a first data set of the data stream; receive from a user a selection of a first data item from the first data set, the data item associated with a location identifier; extract a first value of the first data item associated with the location identifier; identify, in a second data set of the data stream, a second data item associated with the location identifier; extract a second value of the second data item associated with the location identifier; generate a visual representation of the first value associated with the location identifier and the second value associated with the location identifier; and display the visual representation to the user through the user interface, the user interface configured to accept a user input defining one or more parameters of the visual representation.

DETAILED DESCRIPTION

Overview

Figure 1:
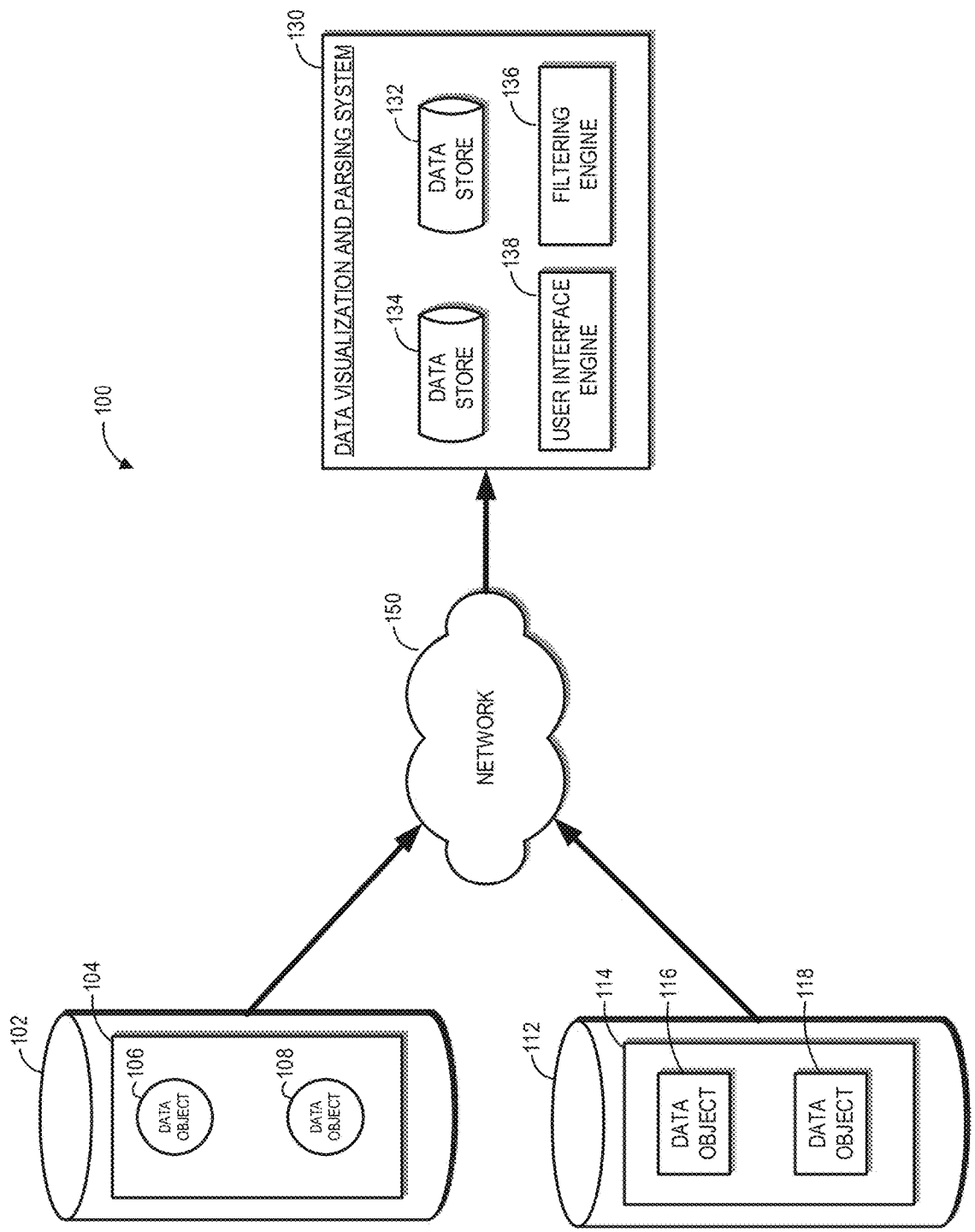
FIG. 1 is a block diagram illustrating an overview of an example data visualization and parsing system.

For purposes of improving the analysis and parsing of large data sets, it is advantageous to interpret data quickly and efficiently. However, data or information is often collected by a variety of devices (e.g., sensors, accelerometers, barometers, thermometers, medical data, financial data, etc. used across various industries, such as medical, legal, manufacturing, aircraft, etc.) and may be represented in machine-readable formats intended principally for processing by machines. Therefore, a user receiving the data may not understand what the received data represents. Thus, the systems and methods discussed herein address, among others, technical problems related to parsing and visualization of large data sets in machine-readable form to provide users with visibility, insights, and associated user interfaces. For example, a user may receive various messages, reports, logs, etc. in which the structure is unknown to the user. One aspect of the systems and methods discussed herein is to intelligently parse, analysis, aggregate, etc. to provide visualizations to a user that allow more efficient determination of the structure of the various messages, reports, logs (generally, "data sets") without having to write parsing code and test the parsing code over multiple iterations.

In some embodiments, a data visualization and parsing system accesses a structured data stream and displays a portion of the data stream to a user through a user interface. For example, a data stream may comprise a plurality of data values indicating a particular attribute or data type received from different devices (e.g., sensors), at different locations, at different times, and/or under various other conditions. For example, numerical measurements of sensor attributes, such as by multiple sensors over a time period, may be included in a data stream. The data stream may be divided into data sets (or "chunks"), which may each include one or more values for a particular attribute in machine readable data. For example, a data stream may include multiple data sets each including multiple sensor measurement data values, each from a discrete point in time.

In some embodiments, the system may receive a selection of a particular data item (in the displayed machine language data) from a user. In some embodiments, the user may click on or highlight a particular data item from the displayed data set (or portion of the data set). The system then identifies other instances of that data type (of the user selected data item) in other data sets of the data stream, and determines (e.g., parsed out or extracts) values of those data items. In some embodiments, the system determines a location within the machine readable code of the selected data item and then uses the determined location to identify other instances of the data type within other data sets of the data stream. The system may then generate a visual representation of the selected data item, such as a time series representation (e.g., in a line graph or similar graph) representing fluctuations of values of instances of the selected data item across multiple (or all) data sets of the data stream.

In some embodiments, the system may further allow the user to customize or define values displayed in the visual representation for further analysis. For example, the user may select a generated graph of data values associated with a temperature data type across multiple data sets, and provide a title such as "Temperature Measurements" to specify the type of data being examined. In some embodiments, the user may identify data types within the machine readable data, such that the system can develop a definition (e.g., a location, rule, criteria, etc.) that may be used to identify additional instances of the data type in other data sets of the data stream. For example, in some embodiments the user may select a portion of a data set and indicate that the selected portion should be defined as a "Pressure Measurement" data type, and the system may then use information regarding the selected data, such as information based on a row, column, character pattern, label, position within the machine-readable data, etc., to create a definition (e.g., criteria) for identifying additional instances of that data type within other data sets of the machine-readable data.

In some embodiments, an interactive user interface allows the user to highlight parameters, instead of values, so that the parameters may be used to create a definition (or criteria) for identifying other instances of the data item. For example, a user could indicate the length of characters that will denote a particular data value. In some embodiments, a user could highlight delimiters, such as particular alphanumeric characters (e.g., abbreviations or identification codes for particular data types) possibly followed by spaces, colons, semicolons, line breaks, etc., of data items.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties (or "Attributes"): information about a data object, such as an entity, that represent the particular data object. Each attribute of a data object has a property type and a value or values. Entity properties, for example, may include name, address, postal code, IP address, username, phone number, etc.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Examples of Data Visualization and Parsing

FIG. 1 is an overview of an example data visualization and parsing system. The example system 100 may comprise a first database or data store 102, a data visualization and parsing system 130, and a second database or data store 124. In some embodiments, the database 102, data visualization and parsing system 130, and database 124 may be connected to each other over network 150. In some embodiments, network 150 may comprise the Internet, a local area network, a wide area network and/or a wireless network.

Database 102 may comprise a structured data set 104 storing data entries. In some embodiments, data set 104 may comprise a number of data objects 106 and 108. In some embodiments, data objects 106 and 108 may comprise the same type of information (e.g., temperature measurements from a temperature sensor). In other embodiments, the data objects may comprise different types of information. By way of example, data object 106 may store a temperature reading from a sensor while data object 108 stores pressure data measured from a barometer. In another example, data objects 106 and 108 may both represent temperature readings from different sensors. Database 102 may be in communication with the data visualization and parsing system 130 via a network 150. For example, database 102 may transmit a copy of data set 104 over network 150 to the data visualization and parsing system 130.

Database 112 may comprise a structured data set 114 comprising a series of data objects 116 and 118. Database 112 may store data objects 116 and 118 from a different source than the data stored in database 102. For example, while database 102 may store temperature measurements collected from a plurality of thermometers, database 112 may store a plurality of medical records from a specific hospital.

Data visualization and parsing system 130 may be configured to receive a structured data stream, allow selection of a data set from the data stream, and generate a visual representation of the data. The data visualization and parsing system 130 may comprise a number of component engines and data stores. In the example system of FIG. 1, data visualization and parsing system 130 comprises a data store 132, a data store 134, a filtering engine 136, and a user interface engine 138. In some embodiments data store 132 may comprise a non-transitory computer readable storage medium configured to store a data stream received over network 150. In some embodiments, the data store 134 may comprise a non-transitory computer readable storage medium configured to at least store computer-executable instructions used to execute the processes of the user interface engine 138. In some embodiments, the data stores 132, 134 are a common computing system (e.g., server, server farm, virtual server(s), etc.).

The data store 132 may be configured to store a structured data stream received from one or more databases via network 150. In some embodiments, the data stream may be received from one data source. For example, the data visualization and parsing system 130 may receive a data stream only from database 102. In some embodiments, data visualization and parsing system 130 may receive data from a plurality of data sources. For example, the data visualization and parsing system 130 may receive data from both database 102 and database 112. In some embodiments, the data store 132 may store the structured data stream while preserving the structure of the received data stream. For example, the data object 116 and data object 118 may originally be stored together in database 112 in a specific order, such as sequential order. When the data visualization and parsing system 130 receives the data stream comprising data object 116 and data object 118, the data objects may be stored in data store 132 in that specific sequential order.

The filtering engine 136 may filter the received structured data stream to divide the data stream into data sets (or "chunks"), which may each include one or more values for a particular attribute in machine readable data. For example, the filtering engine may filter or divide the received data stream (from one or more data sources) into chunks based on time. Each data set or chunk may therefore represent a collection of data received from one or more sensors at a discrete point in time (e.g., a first chunk may represent sensor measurements from x sensors at 3:00 PM and a second chunk represents sensor measurements from the same x sensors at 6:00 PM). In some embodiments, data sets each include a separate data file (e.g., a text or log file) that includes one or more data values from one or more sensors, such that a data stream includes a plurality of such data files. The filtering engine 136 may then pass along the divided data sets to the user interface engine 138.

The user interface engine 138 may present the one or more data sets to a user through a user interface. The user interface engine 138 may then be configured to receive a selection of a particular data item (in the displayed machine language data) from the user. In some embodiments, the user may click on or highlight a particular data item from the displayed data set. The data visualization and parsing system 130 then identifies the data type of the user selected data item and identifies other instances of that data type in some or all of the other data sets or chunks of the overall data stream. The data visualization and parsing system 130 may identify other instances in other chunks of the data stream by extracting values of the selected data item in other chunks of the data set. In some embodiments, the system determines a location within the machine readable code of the selected data item and then uses the determined location to identify other instances of the data type within other data sets of the data stream. The system may then generate a visual representation of the selected data item, such as a line graph representing the distribution of values of data items of the selected data type over time, across the data stream.

Figure 2:
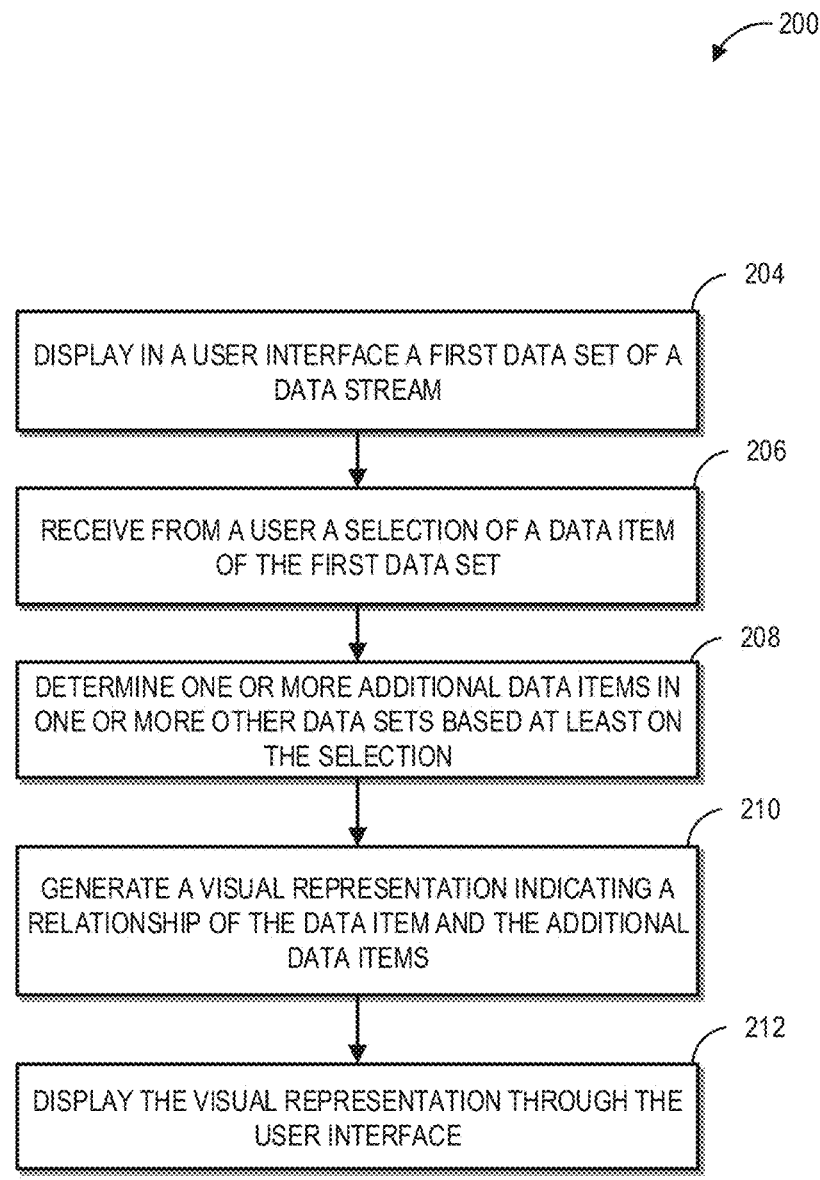
FIG. 2 is a flowchart illustrating an example process for data visualization and parsing.

FIG. 2 is a flowchart illustrating one embodiment of a data visualization and parsing processes, such as may be performed by the system 130 (FIG. 1). Beginning at block 204, the system 130 may display a first data set of a structured data stream received from one or more data source. In some embodiments, the data stream comprises a plurality of data represented in one or more machine-readable formats. In some embodiments, the data stream may comprise data received from a plurality of sensors such as accelerometers, barometers, thermometers, odometers, or other sensors. In some embodiments, the first data set of the data stream may have the same structure as other data sets in the data stream. By way of example, the first data set may comprise the first four bytes in the data stream, with other data sets in the data stream may each comprising subsequent strings of four bytes. In some embodiments, the data set may be structured such that it comprises an instance of a particular attribute in a specific location, time, or other condition. For example, for a data stream comprising collected information from a plurality of sensors, each data set may comprise information collected from the plurality of sensors within a particular data file, such as from a specific hour of the day.

In block 206, the system 130 may receive from a user a selection of a data item in the first data set. In some embodiments, the user may click on or highlight a particular data item from the displayed data set. In some embodiments, the user may select a value and provide a parameter determining the boundaries of the selection. For example, the user may first highlight a data item from the first data set. After making the initial selection, the user may, through control elements in the user interface (e.g., buttons, arrows, or text boxes), increment the highlighted area to include additional data items.

In block 208, the system 130 determines one or more additional data items in one or more other data sets based at least on the selection in block 206. As will be discussed in FIG. 3, the system may identify a data type for the selected data item and identify other instances of the data type of the user selected data item in the data stream. The system may extract a value of the selected data item in other data sets of the data stream. In some embodiments, extracting values from the data stream may be done in iterative steps. For example, after selecting a data item in a first set, the system may await a selection for a second set, and then await a selection for a third set, and so on until a selection has been made for all data sets in a data stream to be analyzed. In some embodiments, the system determines a location within the machine readable code of the selected data item and then uses the determined location to identify other instances of the data type within other data sets of the data stream.

In block 210, the system 130 generates a visual representation indicating a relationship of the selected data item and the other additional data items identified in block 208. The system may generate a variety of visual representations. For example, in some embodiments, the system 130 may generate a line graph representing the distribution of values of the selected data items over time, across the data stream. The type of visual representation may vary according to a data type associated with the selected data items. By way of example, data items comprising numbers may be represented using various graphing functions (e.g., line graphs) that illustrate fluctuations in value throughout the structured data stream. In some embodiments, a data item comprising text may be represented using a histogram or bar graph tracking the number of times a specific word or phrase appears throughout the data stream.

At block 212, the system 130 may display the visual representation through the user interface. In some embodiments, the system may further allow the user to customize or define values displayed in the visual representation for further analysis. For example, the user may select the generated graph and may title it as "Temperature Measurements" to specify the type of data being examined. In other embodiments, the user may define data types within the machine readable data, such that the system can use the definition in identifying additional instances of the data type in other data sets of the data stream using the definition. For example, in some embodiments the user may select a portion of the data and define the selected portion as a "Pressure Measurement" data type. The system may then use information regarding the selected data, such as row, column, character, etc. position of the selected data values within the machine-readable data, to create criteria for identifying additional instances of that data type within other data sets of the machine-readable data.

Figure 3:
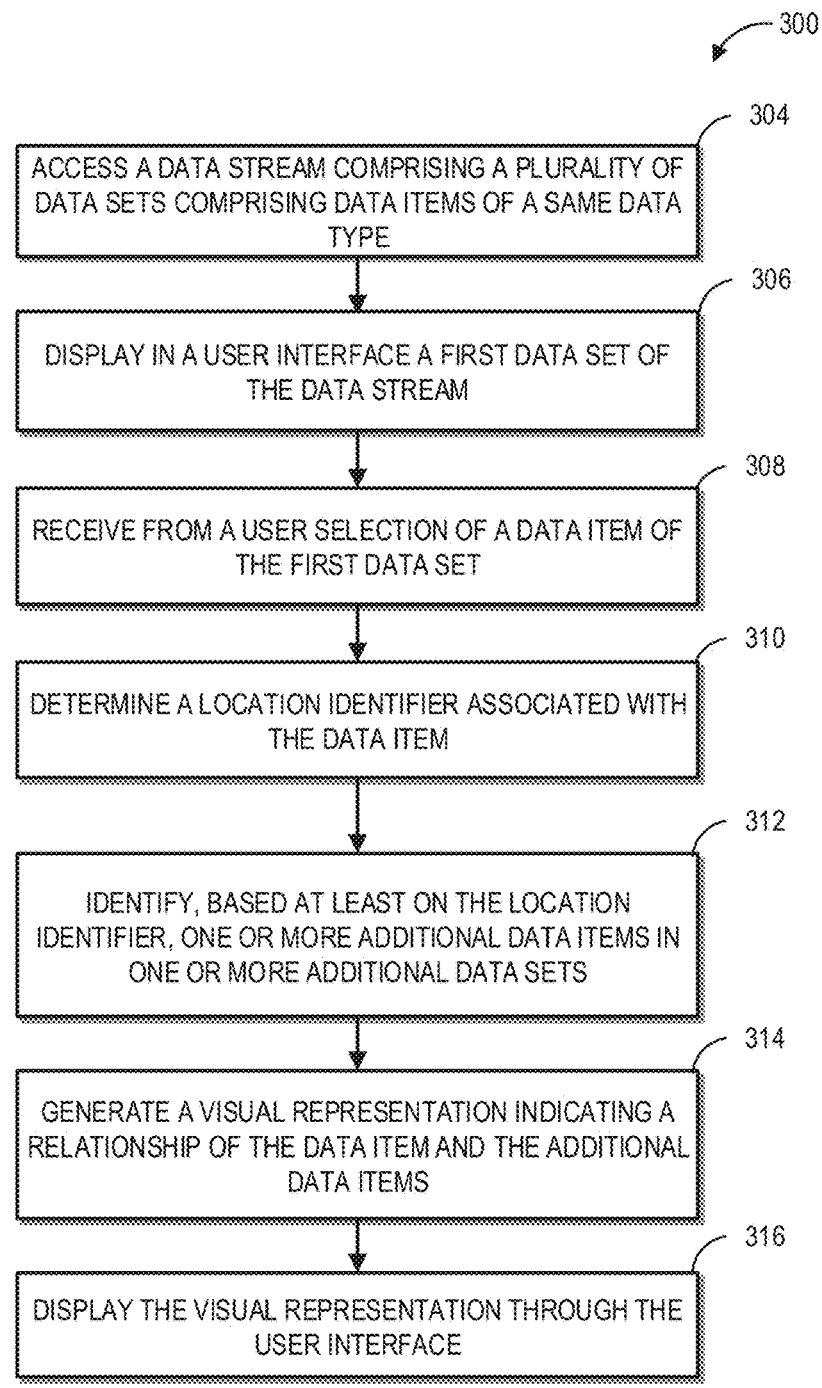
FIG. 3 is a flowchart illustrating an example process for data visualization and parsing.

FIG. 3 is a flow chart illustrating another example process for data visualization and parsing. Beginning at block 304, the system accesses a data stream comprising a plurality of data sets comprising at least some data items of a same data type. In some embodiments, the data stream comprises data represented in one or more machine-readable formats. For example, the data stream may comprise data received from a plurality of sensors such as accelerometers, barometers, thermometers, odometers, or other sensors stored as a continuous stream of values that are not easily reviewable by a user, such as are discussed elsewhere herein.

At block 306, the system may display in a user interface a first data set (or at least a portion of the first data set) of the data stream. In some embodiments, the default data set initially displayed in the user interface may be the data set that appears first in the sequential order of the plurality of data sets. In some embodiments, the user may select a particular data set to display. For example, the user may use control elements (e.g., buttons or arrows) to filter the data sets (e.g., based on time, keywords, etc.) and/or cycle through the plurality of data sets.

At block 308, the system 130 may receive from a user a selection of a data item in the first data set. In some embodiments, the user may click on or highlight a particular data item from the displayed data set. In some embodiments, the user may select a value and provide a parameter determining the boundaries of the selection. For example, the user may first highlight a data item from the first data set. After making the initial selection, the user may, through control elements in the user interface (e.g., buttons, arrows, or text boxes), increment the highlighted area to include additional data items At block 310, the system may determine a location identifier associated with the selected data item. The location identifier associated with the selected data item may be used to identify other instances of the selected data item in other data sets in the plurality of data sets. In some embodiments, the location identifier may be a particular row, column, bit, or tag delineating the location of the selected data. For example, if the user selects the second bit in a string of numbers, the selected bit may be associated with a tag having a value of two, indicating that the selected item is the second bit in the string of numbers.

At block 312, the system may identify, based at least on the location identifier, one or more additional data items in one or more additional data sets. For example, the system may identify one or more additional data items in one or more additional data sets based at least on the location identifier determined in block 310. For example, the second bit of the first data set may be associated with a location identifier "2" representing that the selection is the second bit of the first data set. The system may then iterate through all other data sets (or some automatically and/or manually filtered group of data sets) in the plurality of data sets and extract the value of the data item associated with the location identifier "2." The system may therefore iteratively and reliably determine the value of the data item associated with location identifier "2" throughout the plurality of data sets.

Though the system may automatically search for data items corresponding to the location identifier in the plurality of data sets, in some embodiments, identifying and extracting data items from the data stream may be done in iterative steps. For example, after selecting a data item in a first set, the system may await a selection for a second set, and then await a selection for a third set, and so on until a selection has been made for all data sets in the data stream. In some embodiments, the system determines a location within the machine readable code of the selected data item and then uses the determined location to identify other instances of the data type within other data sets of the data stream.

At block 314, the system may generate a visual representation indicating a relationship of the data item and the additional data items from the additional data sets. The system may generate a variety of visual representations. For example, in some embodiments, the system 130 may generate a line graph representing the distribution of values of the selected data items over time, across the data stream. The type of visual representation may vary according to a data type associated with the selected data items. For example, for a particular type of sensor data, a histogram may be more informative to a viewer while another type of sensor data is more understandable by the viewer in a time-series line chart. As other examples, data items comprising numbers may be represented using a line graph charting the fluctuation in value throughout the structured data stream. In some embodiments, a data item comprising text may be represented using a bar graph tracking the number of times a specific word or phrase appears throughout the data stream.

At block 316, the system 130 may display the visual representation through the user interface. In some embodiments, the system may further allow the user to customize or define values displayed in the visual representation for further analysis. For example, the user may select the generated graph and may title it as "Temperature Measurements" to specify the type of data being examined. In other embodiments, the user may define data types within the machine readable data, such that the system can use the definition in identifying additional instances of the data type in other data sets of the data stream using the definition. For example, in some embodiments the user may select a portion of the data and define the selected portion as a "Pressure Measurement" data type. The system may then use information regarding the selected data, such as row, column, character, etc. position of the selected data values within the machine-readable data, to create criteria for identifying additional instances of that data type within other data sets of the machine-readable data.

Figure 4A:
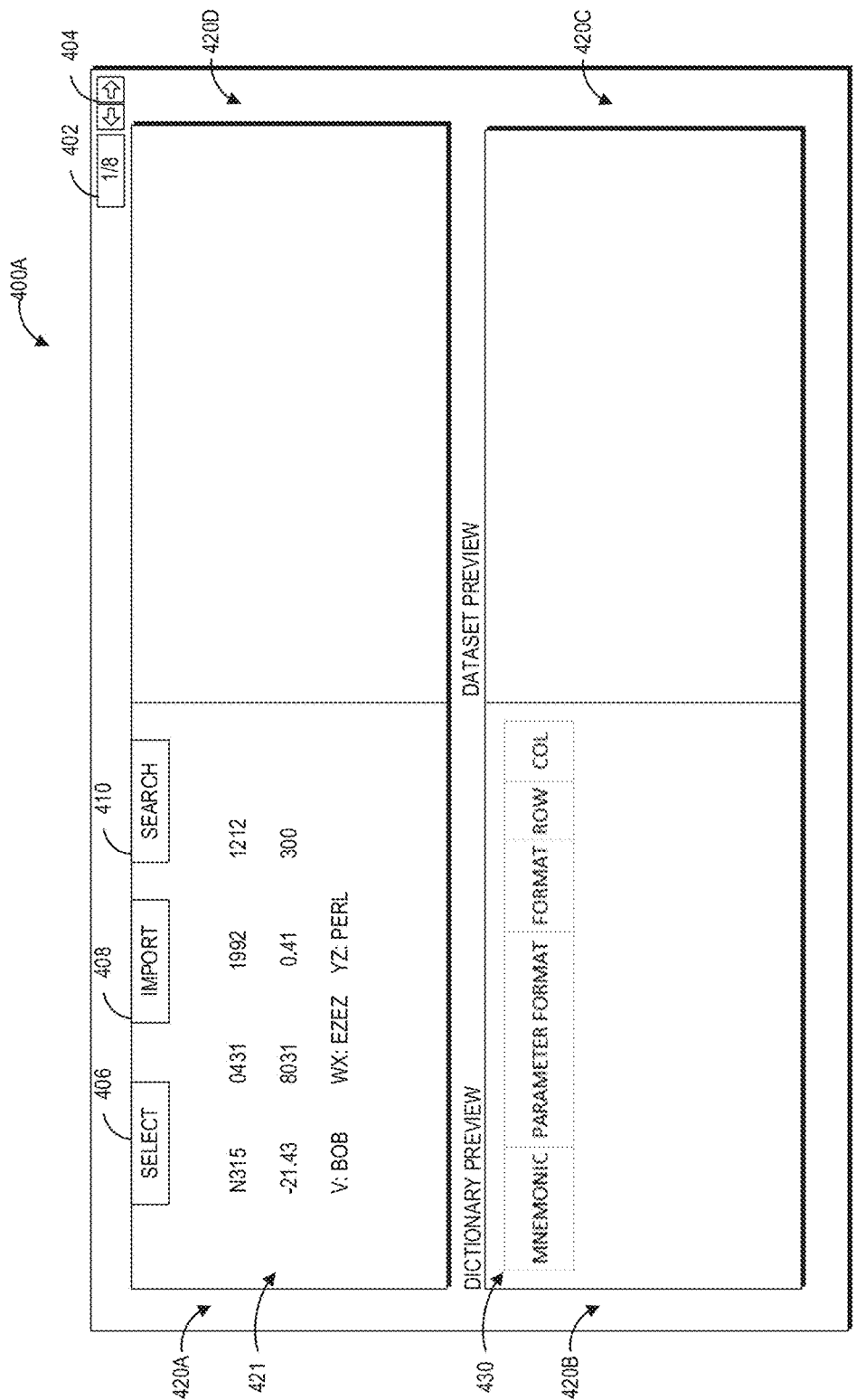
FIG. 4A illustrates an example user interface for data visualization and parsing.

FIG. 4A illustrates an example user interface for data visualization and parsing. User interface 400 (illustrated at different stages of the process as user interface 400A, 400B, and 400C) may comprise a plurality of display portions 420A, 420B, 420C, and 420D. Although the embodiment of FIG. 4A displays a user interface with four display portions, the number of display portions may differ in other embodiments. Display portion 420A displays a data set 421 (or portion of a data set 421) comprising machine readable data (e.g., a text or log file) that may be organized and delimited in some embodiments. For example, in some embodiments the system performs automatic delimiting of data of the data set, such as to separate at certain characters (e.g., each colon), number of characters, and/or other initial data item display criteria.

In this example, indicator 402 displays which data set (of the data sets in the data stream) is currently displayed in the user interface. In the particular embodiment of FIG. 4A, indicator 402 shows that the first of eight data sets is currently displayed in the display portion 420A of the user interface 400. The user may use arrows 404 to cycle to and view the other seven data sets.

In the embodiment of FIG. 4A, a select button 406, import button 408, and search bar 410 are a part of the example display portion 420A. Import button 408 allows the user to direct the data visualization and parsing system to import or receive a data stream from a data source. Clicking on search button 406 allows the user to click, highlight, or otherwise select a data item that is currently displayed as part of data set 421. The user may utilize search bar 410 to search for and automatically highlight a specific data item that matches a string of characters inputted into the search bar.

Display portion 420B corresponds to a dictionary preview of selected data items in display portion 420A. The dictionary preview may be configured to provide information regarding a selected data item in various categories 430, such as mnemonic, parameter info, format, row, column, and/or other information categories. In FIG. 4A, display portion 420B does not display information regarding any particular data items because no data item has been selected yet in display portion 420A.

Display portion 420C corresponds to a dataset preview, which may be configured to display a list of other instances of the selected data type. In some embodiments, the display portion 420C may be configured to display multiple lists corresponding to multiple selected data types. In some embodiments, the user may define how many instances of the selected data type is displayed in display portion 420C. For example, a user may select an option to display up to eight instances of the selected data type. In other examples, a user may select an option to list all instances of the selected data type in the data stream. Because no display item is currently selected in FIG. 4A, no information is currently displayed in display portion 420C. Display portion 420D may be configured to display a visual representation, such as a chart, graph, table, etc. Similar to display portions 420B and 420C, no information is displayed in display portion 420D because no data item is selected yet in portion 420A in FIG. 4A.

Figure 4B:
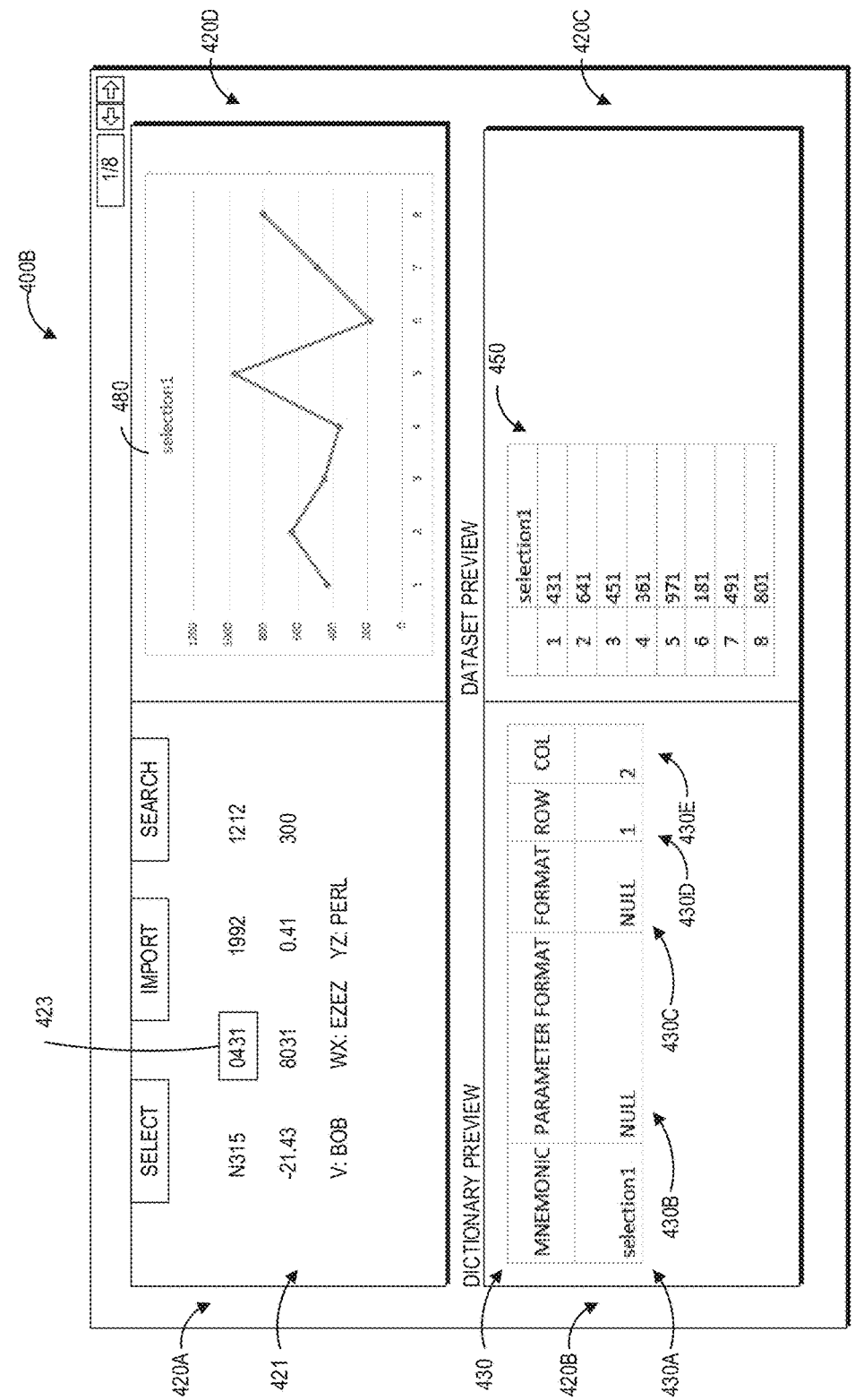
FIG. 4B illustrates an example user interface for data visualization and parsing where the user selects a data item.

FIG. 4B illustrates an example user interface for data visualization and parsing once a user selects a data item. In FIG. 4B, the user interface 400B includes display portion 420A displaying the same data set as in the display portion 420A of user interface 400A (FIG. 4A). However, a data item 423 has been selected by the user. In some instances, the user may not be certain what type of data is represented by data item 423, so the user may select the characters "431" to cause the system to locate additional data items of the same type, which may be useful in allowing the user to determine the data type. For example, the user may not be certain that "431" is a pressure measurement of a particular tool, but in conjunction with other pressure measurements of the particular tool (e.g., over a 30 day time period), the user may be able to more positively identify the data type as coming from the pressure measurement tool, such as by viewing fluctuations, highs, lows, patterns, etc. in one or more visualizations of data items of the same data type, as discussed further below.

In the example of FIG. 4B, for example, data item 423 is automatically associated with the mnemonic "selection1." However, the user may change the mnemonic at any time, such as to reflect the actual data type of the data item. For example, the user may identify that the selected data items represent patient identification numbers in a series of medical records, so the user may change the mnemonic to "patientID." The system may then tag or otherwise associate other instances of the data item, in other data sets, with the user-provided mnemonic.

In this example, location information of the selected data item 423 is also provided as a row value 430D and column value 430E, indicating that the selected data item 423 is located at row 1, column 2 within the data set 421. The row and column information may therefore be used as a location identifier to extract the values of data items with that location identifier in other data sets.

While in some instances row and column information may automatically update in response to the user selection of the displayed data, in other embodiments the user may manually alter or input desired row and column information to indicate the location of the user selection. For example, the user may input "10, 3" as row and column numbers to indicate that the data item in row 10, column 3 is selected. In other embodiments, row, column, number, byte number, or other delimiters may be selected or changed to indicate a range of values that will denote the selected portion of the displayed data. For example, the user may input "10, 3-13" to indicate that the user selection encompasses all values in row 10, columns 3 through 13. In another embodiment, the user may input "30-40" to make a selection from byte 30 to byte 40. In the example of FIG. 4, in addition to row information 430D and column information 430E, information 430B and 430C represent parameters that the user may define to help analyze the selected data item. In FIG. 4B, information 430B and 430C are null because the user has not yet defined the parameter format or format of data item 423.

Display portion 420C displays the dataset preview 450 associated with the selected data item 423. In this example, the dataset preview 450 provides values for other identified instances of selected data item 423, such as in some or all of the data sets in the data stream. Though the dataset preview 450 in FIG. 4B lists only eight values for eight data sets, other embodiments may involve any number of data sets and data items.

Display portion 420D displays a visual representation 480 illustrating the relationship of the selected data item 423 and the other instances of data item 423 throughout the data stream. In FIG. 4B, the display portion 420D displays a line graph tracking the change in value of instances of data item 423 (e.g., values of the same data type as data item) throughout the data sets. In other embodiments, visual representation 480 may utilize different visual representations.

Figure 4C:
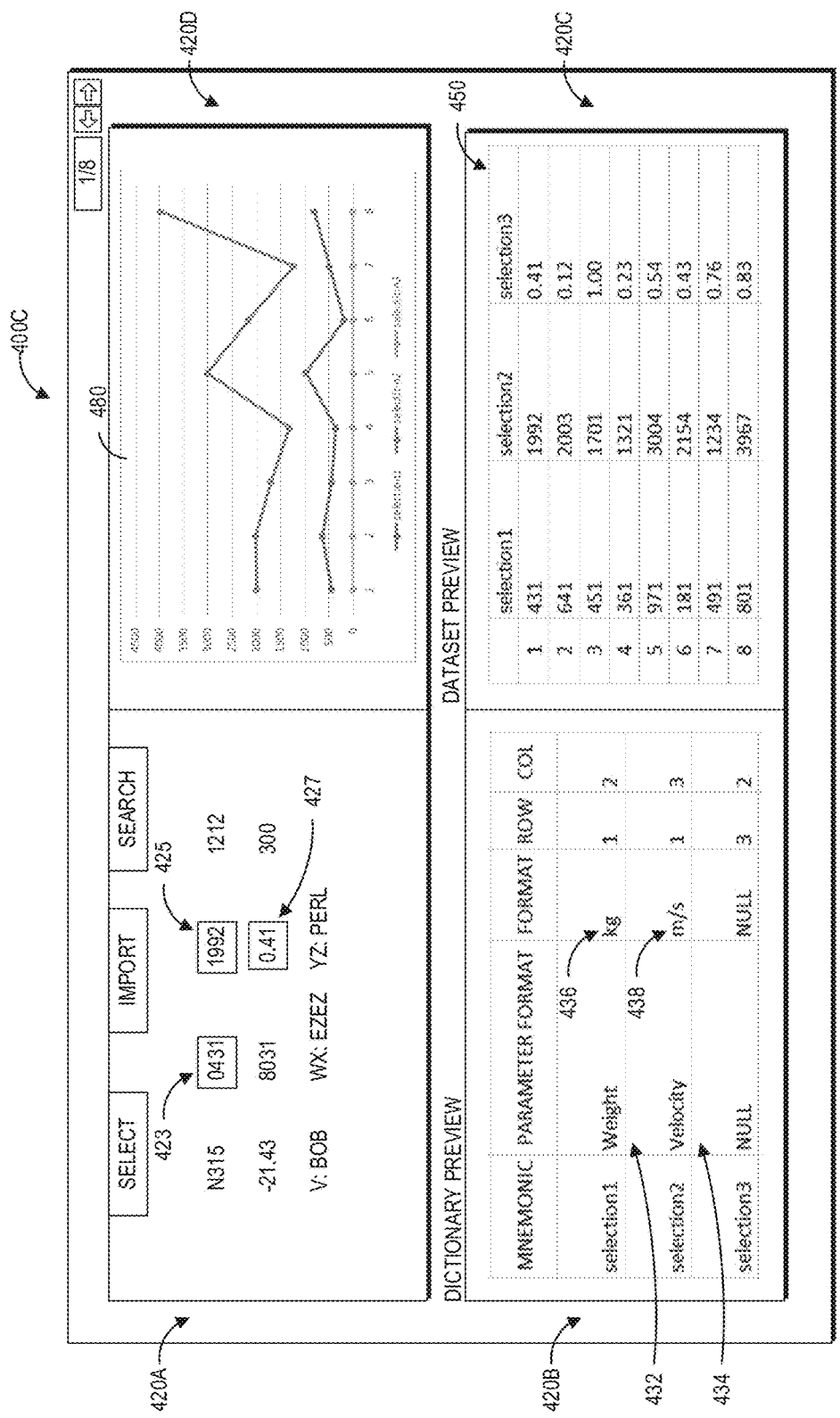
FIG. 4C illustrates an example user interface for data visualization and parsing where the user selects a plurality of data items.

FIG. 4C illustrates an example user interface for data visualization and parsing where the user selects a plurality of data items in a data set. In FIG. 4C, the user has selected data items 423, 425, and 427. The display portion 420B therefore displays information relating to data items 423, 425, and 427 as selection1, selection2, and selection3 respectively. As discussed above, the user may define various parameters associated with the selected data item to improve the analysis of data. The user in FIG. 4C has defined, by providing input into a text box, the parameter formats 432 and 434 as "Weight" and "Velocity" respectively. Furthermore, the user has defined format 436 and 438 as kilograms (kg) and meters per second (m/s) in association with the "Weight" and "Velocity" parameters. Display portion 420C now displays the dataset preview 450, which includes the values for selected data items 423, 425, and 427 throughout some or all of the data stream. Similarly, display portion 420D in FIG. 4C illustrates a visual representation 480 for selected data items 423, 425, and 427 simultaneously in one graph. However, other embodiments may generate a different visual representation. For example, visual representation 480 may only display a graph for one selected data item at a time but allow the user to alternate among data items.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
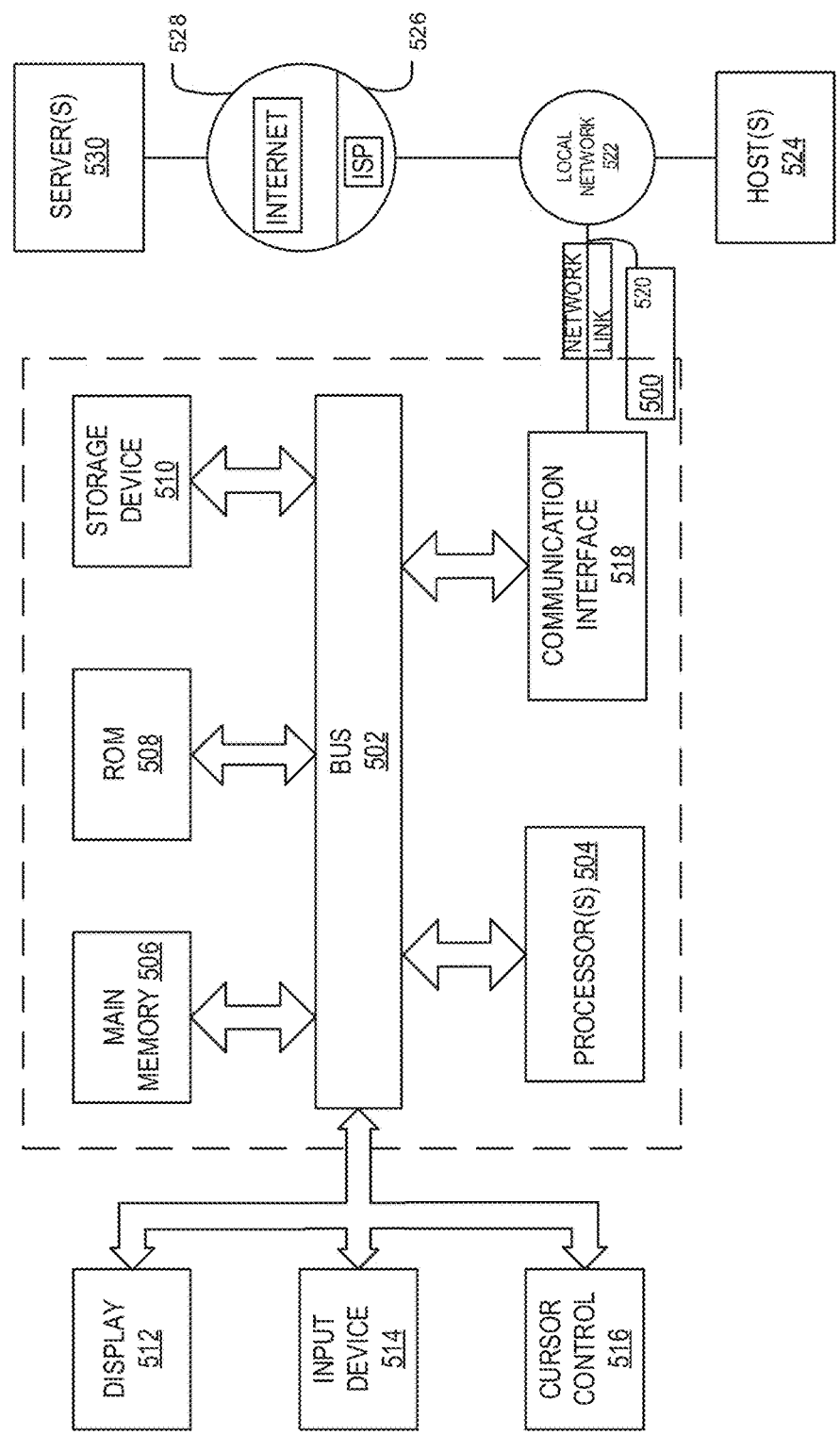
FIG. 5 is a block diagram of an example computing system configured to perform data visualization and parsing.

For example, FIG. 5 is a block diagram that illustrates a computer system 500 upon which various embodiments may be implemented. Computer system 500 includes a bus 502 or other communication mechanism for communicating information, and a hardware processor, or multiple processors, 504 coupled with bus 502 for processing information such as data entries from one or more data stores. Hardware processor(s) 504 may be, for example, one or more general purpose microprocessors configured to execute data visualization and parsing instructions.

Computer system 500 also includes a main memory 506, such as a random access memory (RAM), cache and/or other dynamic storage devices, coupled to bus 502 for storing data entries and instructions to be executed by processor 504. Main memory 506 also may be used for storing temporary variables or other intermediate information during execution of data visualization and parsing instructions to be executed by processor 504. Such instructions, when stored in storage media accessible to processor 504, render computer system 500 into a special-purpose machine that is customized to perform the operations specified in the data mapping and propagation instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and data visualization and parsing instructions.

Computer system 500 may be coupled via bus 502 to a display 512, such as a cathode ray tube (CRT) or LCD display (or touch screen), for displaying graphical user interfaces or data entry information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the identifying, filtering, mapping, and transmitting techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the identifying, filtering, mapping, and transmitting process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information. In some embodiments, communication interface 518 may allow computing system 500 to receive and transmit data entry information from one or more data stores.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In some embodiments, computing system 500 may receive and transmit data entry or data set information from one or more databases across network link 520.

The received code may be executed by processor 504 as it is received, and/or stored in storage device 510, or other non-volatile storage for later execution. The received data entry or data set information may be stored in storage device 510 and manipulated, analyzed, or processed by processor 504 according to data visualization and parsing instructions stored in or received by computing system 500.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing method comprising:
   accessing a data stream comprising a plurality of data items including data items of a same data type received from a plurality of different sensors;
   dividing the data stream into a plurality of data sets, wherein each data set includes multiple data items at least of two different types;
   displaying, in a user interface, a first data set of the plurality of data sets;
   receiving, from a user, selection of a data item of the first data set, wherein the data item is of a first data type;
   responsive to the user selection, parsing the first data set to determine a location identifier indicating location of the user-selected data item within the first data set, wherein the location identifier also indicates locations of other data items of the first data type in other data sets of the plurality of data sets;
   for ones of the other data sets of the plurality of data sets: identifying, based on at least the location identifier, another data item of the first data type;
   generating a visual representation indicating a relationship of the data items of the first data type; and
   displaying the visual representation to the user through the user interface.

2. The method of claim 1, wherein the data stream comprises machine readable formats.

3. The method of claim 1, wherein at least some of the data sets each comprise data items of the same data type from different locations, times, or conditions.

4. The method of claim 1, wherein the selection comprises a click or a highlight.

5. The method of claim 1, wherein a visual representation type is selected based at least partly on the first data type.

6. The method of claim 1, wherein the location identifier comprises a row, column, bit, or tag delineating the location of the user-selected data item within the first data set.

7. The method of claim 1, wherein the user-selected data item is associated with one or more parameters definable by the user.

8. A computing system comprising:
   a first non-transitory computer storage medium configured to store a data stream comprising a plurality of data items including data items of the same data type received from a plurality of different sensors;
   a second non-transitory computer storage medium configured to at least store computer-executable instructions; and
   one or more computer hardware processors in communication with the second non-transitory computer storage medium, the one or more computer hardware processors configured to execute the computer-executable instructions to at least:
      divide the data stream into a plurality of data sets, wherein each data set includes multiple data items at least of two different data types;
      display in a user interface a first data set of a plurality of data sets in the data stream;
      receive from a user a selection of a first data item from the first data set, wherein the data item is of a data type;
      responsive to the user selection, parse the first data set to determine a location identifier indicating location of the user-selected data item within the first data set, wherein the location identifier also indicates locations of other data items of the first data type in other data sets of the plurality of data sets;
      extract a first value of the first data item associated with the location identifier;

identify, based at least on the location identifier, a second data item in a second data set, wherein the second data item is of the first data type;

extract a second value of the second data item;

generate a visual representation of the first value of the first data item and the second value of the second data item; and display the visual representation to the user through the user interface, the user interface configured to accept user input defining one or more parameters of the visual representation.

9. The system of claim 8, wherein the data stream comprises a plurality of data represented in one or more machine readable formats.

10. The system of claim 8, wherein the data stream is configured to comprise values associated with a particular attribute across multiple locations, times, or conditions.

11. The system of claim 8, wherein each data set is configured to comprise an instance of an attribute in a particular location, time, or condition.

12. The system of claim 8, wherein the selection comprises a click or a highlight.

13. The system of claim 8, wherein a visual representation type is selected based at least partly on the first data.

14. The system of claim 8, wherein the location identifier comprises a row, column, character offset, or tag delineating the location of the first data item.

15. The system of claim 8, wherein the location identifier is associated with one or more parameters definable by the user.

* * * * *